(12) United States Patent
Waugh

(10) Patent No.: US 8,335,908 B2
(45) Date of Patent: Dec. 18, 2012

(54) DATA PROCESSING APPARATUS FOR STORING ADDRESS TRANSLATIONS

(75) Inventor: Alex James Waugh, Cambridge (GB)

(73) Assignee: ARM Limited, Cambridge (GB)

( * ) Notice: Subject to any disclaimer, the term of this patent is extended or adjusted under 35 U.S.C. 154(b) by 239 days.

(21) Appl. No.: 12/801,926

(22) Filed: Jul. 1, 2010

(65) Prior Publication Data

US 2012/0005454 A1 Jan. 5, 2012

(51) Int. Cl.
G06F 12/00 (2006.01)
(52) U.S. Cl. ....................................................... 711/207
(58) Field of Classification Search .................. None
See application file for complete search history.

(56) References Cited

U.S. PATENT DOCUMENTS

| 7,024,536 B2* | 4/2006 | Park et al. ..................... 711/206 |
| 2005/0021925 A1* | 1/2005 | Clark et al. ..................... 711/203 |
| 2009/0106524 A1* | 4/2009 | Chen et al. ..................... 711/206 |

* cited by examiner

Primary Examiner — Hiep Nguyen
(74) Attorney, Agent, or Firm — Nixon & Vanderhye P.C.

(57) ABSTRACT

Memory address translation buffering circuitry is provided comprising a primary storage bank and a secondary storage bank. Storage bank accessing circuitry is provided to perform a parallel lookup of the primary storage bank and the secondary storage bank for virtual to physical address translation entries. Buffering management circuitry is configured to transfer an address translation entry between the primary storage bank and the secondary storage bank dependent upon an occupancy level of at least one of the primary storage bank and secondary storage bank.

20 Claims, 8 Drawing Sheets

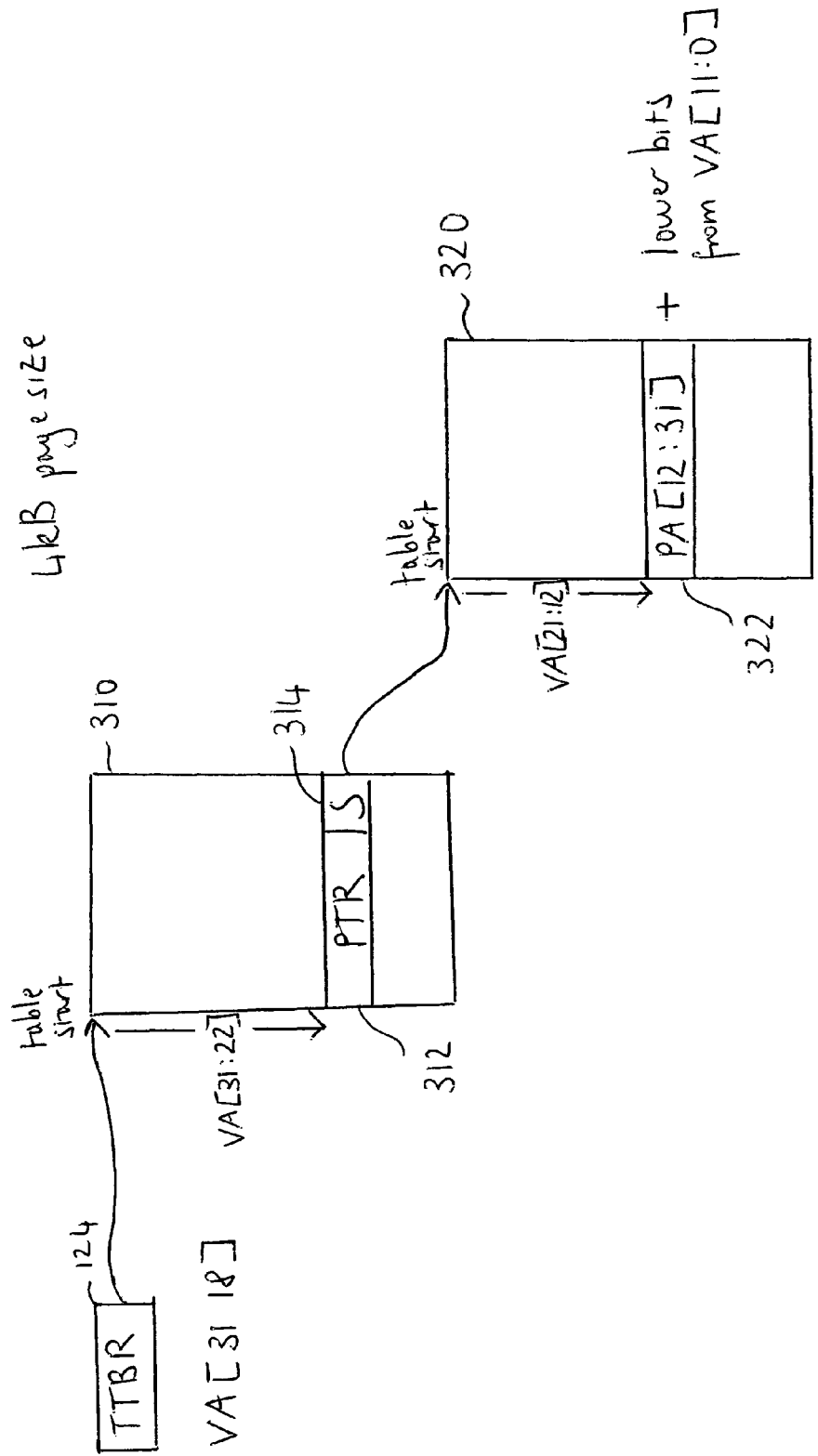

example for MEM TYPE field

DATA PROCESSING APPARATUS FOR STORING ADDRESS TRANSLATIONS

BACKGROUND OF THE INVENTION

Field of the Invention

This invention relates to the field of data processing systems. More particularly, this invention relates to memory address translation mechanisms for translating virtual memory addresses to physical memory addresses within data processing systems.

It is known to provide data processing systems with memory address translation circuitry such as memory management units or translation lookaside buffers which serve to translate the virtual memory addresses generated by a processor into physical memory addresses for accessing memory system. A translation lookaside buffer (TLB) is a central processing unit cache typically used as part of a memory management system to improve virtual address translation speed. The translation lookaside buffer is basically a fast buffer containing recently used virtual to physical address translations. When a virtual address is output by a processing core, that virtual address (or a part thereof) is used as a search key to search for a corresponding physical address.

If the requested address is present in the translation lookaside buffer then a search of the translation lookaside buffer will quickly yield a match and the retrieved physical address can be used by the processor to access memory. This is called a TLB hit. If on the other hand the requested address is not present in the TLB, i.e. in the event of a TLB miss, the translation is then performed using translation tables stored in the main memory and the translation, proceeds by looking up one or more page tables in a process called a page table walk. A top down page table walk operation is performed in which a sequence of index lookups into different levels of the page tables are performed until the full virtual address has been translated into the target physical address. However a page table walk is an expensive process and involves reading the contents of multiple memory locations in order to compute the physical address, so is costly in terms of processing cycles.

It is also known to use micro-translation lookaside buffers. In processors such as the ARM 11 MPCore processor a micro-TLB is designed so that the physical addresses can be accessed in time to be able to perform the requested cache access. Using the virtual address value generated by the processor core, this produces the corresponding physical address and page attributes within a single clock cycle. In the ARM 11 processor the micro-TLB is organised as an eight-entry virtual address based micro-TLB that does alignment checks and access permission checks. Thus the micro TLB comprises fewer entries than the main TLB thereby enabling faster access to the micro TLB. It is also connected to the main TLB block which handles micro-TLB misses.

It is desirable to produce a memory translation system that efficiently performs virtual to physical address translations yet is economical in terms of power consumption and circuit area yet offers good performance and fast translation times.

The research paper "A Banked-Promotion TLB For High Performance and Low Power" by Jung-Hoon Lee, Jong-Soo Lee, Seh-Woong Jeong, and Shin-Dug Kim discloses a translation lookaside buffer system in which one translation lookaside buffer space is divided into two banked-TLBs. In this system when a miss occurs in both TLBs, if three or four consecutive virtual page numbers (representing the tags of a 16 KB page) are found to already exist within a small TLB, then these three physical page numbers (representing one of four sequential 4 KB pages) are promoted with the incoming page to create a new large page entry that corresponds to a 16 KB page. Thus in this system copying between different banks of the TLBs depends on the particular properties of the current bank content.

There is a requirement to produce an address translation system that saves area and power and is capable of improving the timing of address translation lookups.

Viewed from one aspect the present invention provides an apparatus for processing data comprising: translation buffering circuitry configured to store a plurality of memory address translation entries, each translation entry providing a conversion from a virtual memory address to a physical memory address, said buffering circuitry comprising: a primary storage bank configured to store at least one primary address translation entry; a secondary storage bank configured to store at least one secondary address translation entry; storage bank accessing circuitry configured to be responsive to receipt of a virtual memory address for which a translation is required to perform parallel access to both said primary storage bank and said secondary storage bank to establish if any of said at least one primary address translation entry and said at least one secondary address translation entry represents a match for said virtual memory address; buffering management circuitry configured to transfer at least one address translation entry between said primary storage bank and said secondary storage bank depending upon an occupancy level of at least one of said primary storage bank and said secondary storage bank.

The present invention recognises that by providing both a primary storage bank and a secondary storage bank that are accessed in parallel and by providing buffering management circuitry that transfers translation entries between the primary storage bank and the secondary storage bank depending upon a occupancy level of at least one of the two storage banks a great deal of flexibility is offered in terms of the functionality of the translations. Splitting the translation buffering circuitry into two banks enables entries in different banks to hold different amounts of information. Reducing the amount of information stored in some of the entries is a convenient way to save area and power. Furthermore, new translation entries can be preferentially stored in a given one of the two banks and this can be used as a mechanism for reducing the fanout on the source of the updates (e.g. the fanout of wires from the main TLB to the storage bank in question) which is likely to improve the timing characteristics for performing the address translations. Promotion of existing entries between the two banks depending upon an occupancy level of the banks provides an efficient way of managing contents of the primary and secondary storage bank without having to analyse bank contents and improves the accessibility to recently performed translations.

The present technique is an improvement on, for example, storing less information in each translation buffer circuitry entry in order to improve access times and then performing a lookup to, for example, a main translation lookaside buffer or another different level of the memory hierarchy when the missing information is needed. Storing a restricted amount of information in one level of the memory hierarchy and accessing the addition information in a different level of the memory hierarchy when that information is needed takes more processing cycles and consumes more power and is considerably more complex than the present technique. Provision of the primary and secondary storage bank that are accessed in parallel and the buffer management circuitry that promotes entries depending upon occupancy level of at least one of the storage banks also provides an efficient way of improving performance. The present technique compares favourably with alternative solutions to address timing problems in performing address translations such as the technique of adding further pipeline stages because addition of pipeline stages or registers is highly likely to increase the circuit area and thus increase production costs. Addition of pipeline stages also increases the number of processing cycles required to complete an operation and thus can reduce performance.

It will be appreciated that the number of translation entries stored in the primary storage bank could be equal to the number of translation entries stored in the secondary storage bank. However, in some embodiments, the primary storage bank has a first number of primary address translation entries and the secondary storage bank has a second number of secondary address translation entries and the first number is less than the second number. Providing that the number of translation entries in the primary storage bank is less than the number of translation entries in the secondary storage bank in this way enables more efficient use of the translation buffering circuitry so that in situations where timing is more critical, such as when a new address translation entry is being stored in the translation buffering circuitry, the primary storage bank can be preferentially used for storage to reduce the fanout of circuit lines from the source of the new translation to the bank that will next store that new translation. This improves efficiency of the translation buffering circuitry.

It will be appreciated that the translation buffering circuitry could be responsive to a new buffering request for storage of a newly generated translation to store that translation in either the primary storage bank or the secondary storage bank depending on a number of different factors such as the current occupation levels of the respective storage banks. However, in one embodiment the buffering management circuitry is configured to be responsive to the receipt of a new buffering request for the buffering of a translation from a virtual memory address to a physical memory address to preferentially store the translation in the primary storage bank rather than in the secondary storage bank. Preferentially storing all new translations in the primary storage bank, which has fewer address translation entries than the secondary storage bank means that the translation can be stored more rapidly due to the ease of access and lookup of storage bank having fewer translation entries. When the storage bank is capable of holding more translation entries, the side effect of a long memory reference latency can occur with consequential unfavourable effects on power consumption. Thus by preferentially accessing the primary storage bank for storage of new translation entries, the memory latency can be readily reduced.

In some embodiments, the buffering management circuitry is configured to store the new translation in the primary storage bank in a predetermined processing cycle and to conditionally promote the new translation for storage in the secondary storage bank in a later processing cycle. This allows the new translation to be efficiently stored in the smaller primary storage bank and the conditional promotion allows space to be freed up in the primary storage bank for subsequently generated new translations. The latency that can be associated with accessing the secondary storage bank, which comprises more entries than the first storage bank is ameliorated because the promotion is not being performed during a timing critical processing cycle, i.e. the processing cycle in which the new translation is initially stored in the buffering management circuitry.

It will be appreciated that the primary storage bank and the secondary storage bank could each support the same number of page sizes, for example, supporting a single page size or each supporting a plurality of different page sizes. However, in one embodiment, the primary storage bank supports a first number of page sizes and the secondary storage bank stores a second number of page sizes, the second number being different from the first number. This provides a degree of flexibility in operation of the translation buffering circuitry. In one such embodiment, the first number of page sizes is greater than the second number of page sizes. Accordingly, the primary storage bank supports a greater number of page sizes than the secondary storage bank. This means that the new translation can be more efficiently stored in the primary storage bank since if the information that is coming from the source of the new translations is capable of specifying different page sizes then more of these page sizes can be readily accommodated by the primary storage bank. Furthermore, since the primary storage bank contains fewer translation entries than the secondary storage bank, the penalty of storing more detailed information with regard to page sizes is reduced because the number of entries can be kept to a manageable level.

In some embodiments the at least one primary address translation entry of the primary storage bank has at least one respective primary attribute specifier of a first bit-length and the at least one secondary address translation of the secondary storage bank has at least one respective secondary attribute specifier of a second bit-length and wherein the second bit-length is different from the first bit-length. This provides the flexibility to enable different quantities of attribute information to be stored in the primary storage bank and the secondary storage bank and for the quantities of information to be adapted according to the memory latency characteristics and performance characteristics of the translation buffering circuitry. In some such embodiments, the first bit-length is greater than the second bit-length, which means that the attributes of the primary address translation entries contain more information than individual entries of the attributes of the secondary address translation entries. Since the number of translation entries in the secondary storage banks exceeds the number of translation entries in the primary storage bank, the overhead of maintaining more attribute information in the primary storage bank can be controlled by limiting the number of entries stored therein. Storing a reduced amount of attribute information per entry in the secondary storage bank allows the area of the secondary storage bank circuitry to be controlled despite a greater number of entries being stored therein relative to the primary storage bank.

In some embodiments, an address translation entry stored in the primary storage bank is conditionally promoted to the secondary storage bank, the conditional promotion depends on a comparison between at least a portion of the contents of the primary attributes specifier and the contents of the secondary attributes specifier. This provides a convenient way of determining whether or not it is efficient to promote an address translation from the primary storage bank to the secondary storage bank. In some such embodiments upon promotion of the new translation from the primary storage bank to the secondary storage bank, at least a portion of contents of the primary attribute specifier of the new translation entry identified for promotion is discarded upon promotion of the new translation to the secondary storage bank as a consequence of the first bit-length being greater than the second bit-length. This allows promotion of the translation entry from the primary storage bank to the secondary storage bank despite the differences in the bit-length of the attributes stored for each entry in the two different storage banks.

The information that is discarded before promotion to the secondary storage bank can be conveniently chosen such that it is not required for the majority of accesses. For example, something that is only required by special instructions and not normal loads or stores or something that is only present for faulting pages. It is convenient when promoting translation entries from the primary storage bank to the secondary storage bank to enable the promotion to occur by simply discarding the additional attribute information that is only held in the first storage bank but not in the second storage bank. If discarding of the additional information would cause the meaning of the entry selected for promotion to be changed then the entire entry can be discarded rather than being promoted to the secondary storage bank. Upon a subsequent access a page table walk would be performed to recover the discarded entry.

In some embodiments, it is convenient to make the assumption that all secondary translation entries of the secondary storage bank have a given value of a predetermined attribute. This reduces the volume of information that needs to be stored in the secondary storage bank and thus reduces the circuit area of that portion of the circuitry. However, it is still known that the attributes whose specific values are not actually stored have a given value by virtue of the fact that the translation entry is in fact stored in the secondary storage bank.

In some embodiments if a value of the predetermined attribute of a primary translation entry corresponding to a new address translation is different from the given value assumed for all entries of the second storage bank then the conditional promotion of the new translation from the primary storage bank to the secondary storage bank is aborted and the new translation is completely discarded upon eviction from the primary storage bank. Thus if that translation is required in future it will have to be retrieved from a place other than the primary storage bank or the secondary storage bank e.g. it can be retrieved by the performing of a page table walk. This provides a convenient means for streamlining the information contained in the secondary storage bank.

In other embodiments, if a corresponding value of the predetermined attribute of a primary translation entry corresponding to the new translation is different from the given value assumed for the secondary storage bank, then the conditional promotion of the new translation from the primary storage bank to the secondary storage bank is performed such that a portion of the new translation is promoted to the secondary storage bank whilst a further different portion of the new translation is discarded. The information that is discarded upon promotion to the secondary storage bank can be chosen such that it is not required for the majority of accesses so the impact on efficiency is reduced. However, should the full set of attributes be required, then they can always be obtained by performing a search of the page tables within the main memory.

It will be appreciated that the primary attributes specifier of the primary storage bank could contain information relating to any one of a number of different properties of the translation entry. In particular, it could comprise any of the full set of attributes that is output by the main memory following a page table walk. However, in one embodiment, the primary attribute specifier comprises at least one of a domain specifier, a security state specifier and a memory-type attribute specifier. These are examples of information that it is convenient to store in the primary storage bank but not in the secondary storage bank. Thus the primary attribute specifier can specify which one of a plurality of domains of the physical memory a memory address corresponding to the translation corresponds to, the secondary attribute specifier can be assumed to contain entries only relating to domains that are currently accessible. If a victim entry in the first bank has a domain that is not currently accessible then it can be discarded rather that promoted to the secondary storage bank.

With regard to the security state entries, the primary attribute specifier can specify that the security state is either a secure state or a non-secure state whereas all entries of the secondary storage bank can be assumed to refer to the current security state and any victim entries in the first bank that relate to a different security state can be discarded rather than promoted to the secondary storage bank when the primary storage bank is fully occupied. With regard to the memory-type attributes, if a given processor design only supports a subset possible memory attributes or is unlikely to use all of the attributes then the full set of memory attributes can be specified by the primary attribute specifier of the primary storage bank whilst a more limited set of memory attributes can be specified by the secondary attribute specifier of the secondary storage bank.

In some embodiments, the primary storage bank belongs to a first hierarchical level in memory hierarchy whilst the secondary storage bank belongs to a second hierarchical level in a memory hierarchy. In some such embodiments, the first hierarchical level is the same as the second hierarchical level. For example, both the primary storage bank and the secondary storage bank can belong to a micro-translation lookaside buffer or they can both belong to a main translation lookaside buffer. In alternative embodiments the first hierarchical level is different from the second hierarchical level. Thus the primary storage bank and the secondary storage bank could correspond to different hierarchical levels of the memory management unit hierarchy provided that the banks are accessed in parallel.

According to a second aspect, the present invention provides a method of processing data comprising the steps of: storing a plurality of memory address translation entries in translation buffering circuitry, each translation entry providing a conversion from a virtual memory address to a physical memory address; a primary storage bank configured to store at least one primary address translation entry in a primary storage bank of said translation buffering circuitry; storing at least one secondary address translation entry in a secondary storage bank of said translation buffering circuitry; responsive to receipt of a virtual memory address for which a translation is required, performing parallel access to both said primary storage bank and said secondary storage bank to establish if any of said at least one primary address translation entry and said at least one secondary address translation entry represents a match for said virtual memory address; and transferring at least one address translation entry between said primary storage bank and said secondary storage bank depending upon an occupancy level of at least one of said primary storage bank and said secondary storage bank.

According to a third aspect, the present invention provides apparatus for processing data comprising: means for translation buffering configured to store a plurality of memory address translation entries, each translation entry providing a conversion from a virtual memory address to a physical memory address, said buffering circuitry comprising: first means for storing at least one primary address translation entry; second means for storing at least one secondary address translation entry; means for translation accessing configured to be responsive to receipt of a virtual memory address for which a translation is required to perform parallel access to both said first means for storing and said second means for storing to establish if any of said at least one primary address translation entry and said at least one secondary address translation entry represents a match for said virtual memory address; means for buffering management configured to transfer at least one address translation entry between said first means for storing and said second means for storing depending upon an occupancy level of at least one of said first means for storing and said second means for storing.

BRIEF DESCRIPTION OF THE DRAWINGS

The present invention will be described further, by way of example only, with reference to embodiments thereof as illustrated in the accompanying drawings, in which:

FIG. 3A and FIG. 3B schematically illustrate page table walks for two different sizes of pages;

DESCRIPTION OF THE PREFERRED EMBODIMENTS

Figure 1:
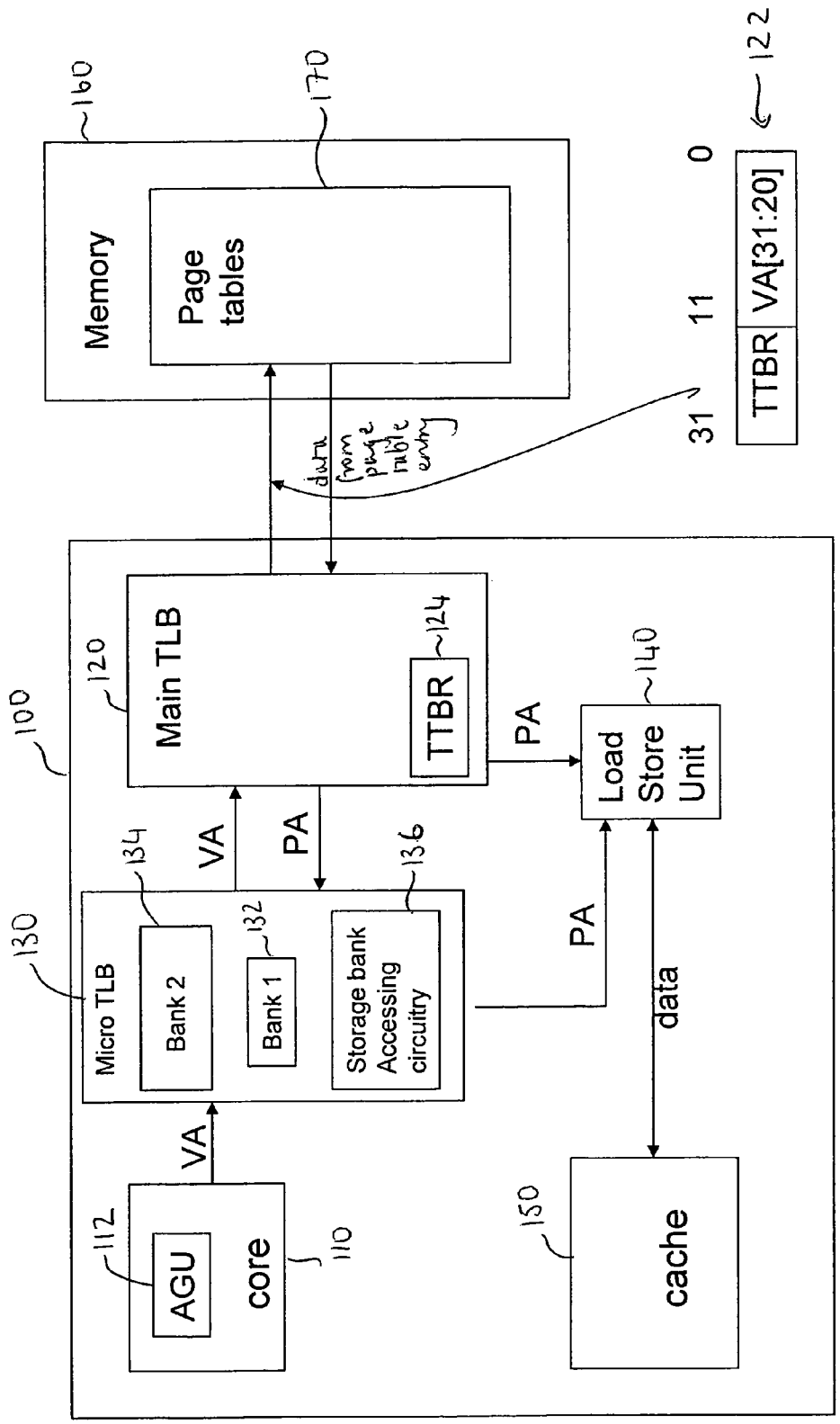
FIG. 1 schematically illustrates a data processing apparatus according to a first embodiment of the present invention.

FIG. 1 schematically illustrates a data processing apparatus according to an embodiment of the present invention. The data processing apparatus 100 comprises a processor core 110 comprising an address generation unit (AGU) 112, a main translation lookaside buffer (TLB) 120 and a micro TLB 130. The apparatus further comprises a load store unit 140 and a cache 150. The data processing apparatus 100 has access to a main memory 160 comprising a set of page tables 170.

The main TLB 120 performs memory address translations to translate virtual memory addresses to physical memory addresses. The main TLB 120 comprises a translation table base register (TTBR) 124 that stores an entry point for performing page table walk operations in the page tables 170 for the purpose of virtual address to physical address conversion. The value stored in the TTBR 124 is process-specific so that a given processing task has a given page table or set of page tables is associated with it.

The address generation unit 112 within the core 110 generates a virtual address corresponding to a memory access to be performed (in association with a particular processing task) and this virtual address is passed from the processor core 110 to the micro TLB 130. The micro TLB 130 serves as rapidly accessible cache for performing virtual address to physical address translations and is accessed prior to the main TLB 120. Accordingly, the micro TLB forms a lower level of the memory hierarchy and the main TLB forms a higher level of the memory hierarchy. The micro TLB 130 comprises a primary storage bank 132 and a secondary bank 134 (i.e. two different storage banks) for storing virtual address to physical address translation entries. In alternative embodiments, three or more banks could be provided within the micro TLB 130. In the FIG. 1 embodiment, the primary storage bank 132 is configured to store a single virtual address to physical translation entry, which we shall denote a primary address translation entry. The secondary storage bank 134 is configured to store a plurality of virtual address to physical address translation entries that we shall denote secondary address translation entries. The single address translation entry stored in the primary storage bank 132 corresponds to a most recently derived virtual address to physical address translation looked up in either main TLB 120 or in the page tables 170.

The primary storage bank 132 and the secondary storage bank 134 are looked up in parallel by a set of storage bank accessing in circuitry 136 provided within the micro TLB 130. If a translation entry matching the particular virtual address output by the address generation unit 112 and supplied to the micro TLB 130 cannot be matched with an address translation entry in either the primary storage bank 132 or the secondary storage bank 134 then the virtual address is supplied to the main TLB 120, which performs a further look up seeking a translation of the given virtual address. If a translation is not found within the translation entries stored within the main TLB itself, then a page table walk is performed with reference to the page tables 170 in main memory 160. In order to perform this page table walk, the main TLB outputs the 32 bit field illustrated as 122 in FIG. 1. The 32-bit field 122 specifies the value of the starting point for the page table walk derived from the TTBR 124. This is concatenated with the upper twelve bits (i.e. bits 20 to 31) of the virtual address that is output by the AGU 112 to form the field 122. This 32-bit field is used to select a page table entry within the main memory. Although the page tables in main memory 160 contain the information required to translate the virtual address to a corresponding physical address, the actual conversion is performed within the main TLB 120. Accordingly, when a page table walk is performed in main memory 160, page table entries are passed back to the main TLB 120 from main memory 160 and these page table entries are used by the main TLB to perform the conversion from the virtual address to a corresponding physical address.

The memory 160 supports page tables 170 comprising a plurality of different page sizes. Once the page table lookup has been successfully performed in main memory 160 the relevant page table entries are fed back from the main memory 160 to the main TLB 120, which uses this information to convert the given virtual address to a corresponding physical address and to determine a full set of attributes associated with that physical address. The main TLB 120 in turn supplies that physical address and associated attribute information to the load store unit 140, which performs the required memory access to for example the cache memory 150 or the main memory 160 using the physical address.

Figure 2:
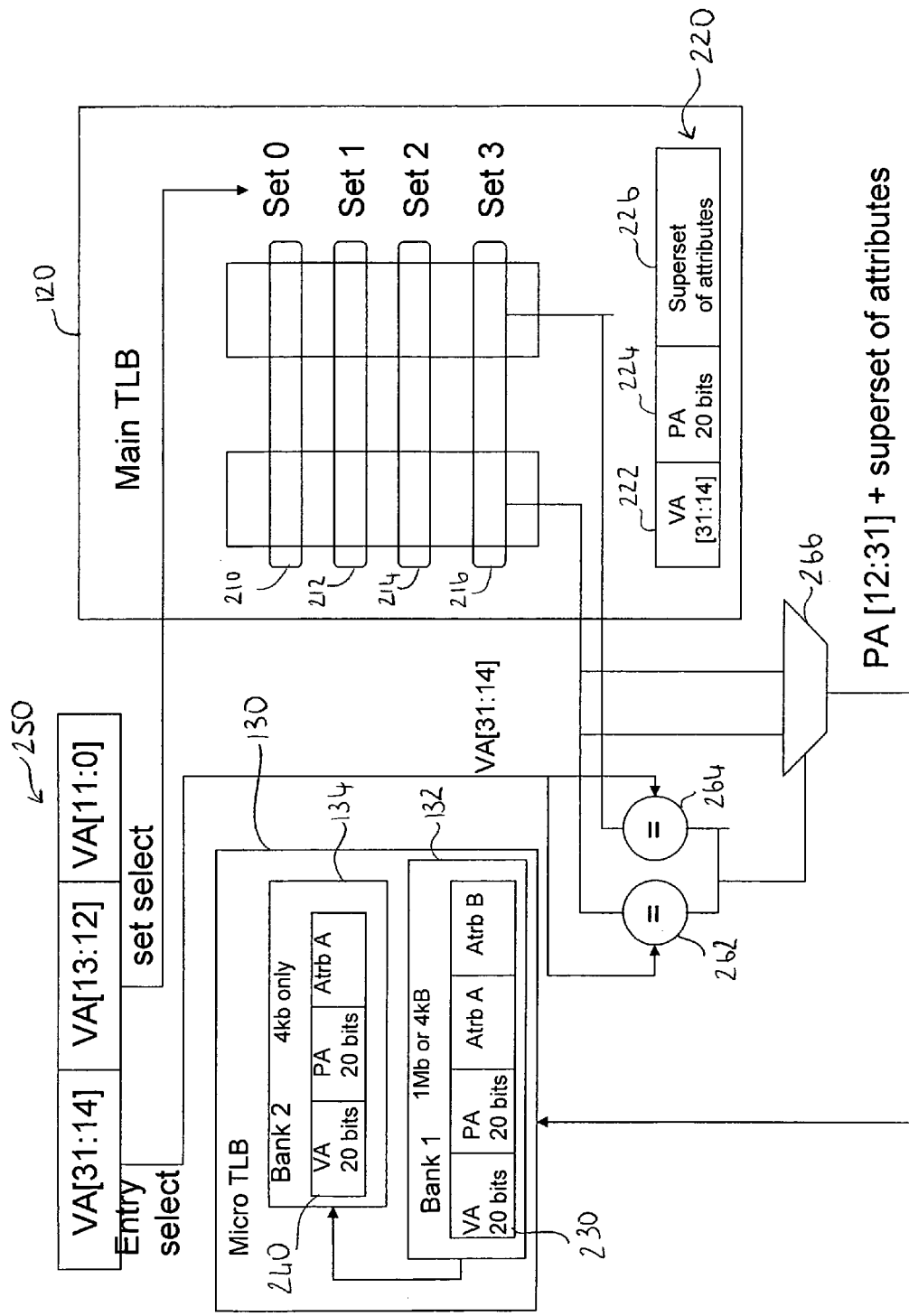
FIG. 2 schematically illustrates the main translation lookaside buffer and the micro-translation lookaside buffer of FIG. 1 in more detail.

FIG. 2 schematically illustrates in more detail the micro TLB and the main TLB of FIG. 1. As shown in FIG. 2, the main TLB 120 comprises the set of main TLB address translation entries an example of which is an entry 220. This entry 220 comprises: bits [31:14] of the 32 bit virtual address corresponding to the memory entry; a physical address field 224 storing 20 bits of a physical address corresponding to the virtual address stored in the field 222; and further comprises a superset of attributes 226 associated with the particular memory location. Examples of the superset of attributes include the page size corresponding to the particular page table entry, the security state associated with the entry (i.e. secure or non-secure) and memory type attributes such as the cacheability of the memory location. The attributes will be explained in more detail with reference to FIG. 4.

The main TLB 120 comprises address translation entries stored in a set-associative manner, similarly to the cache 150. This particular main TLB comprises a first RAM 272 and a second RAM memory 274. Entries within the main TLB are divided up into four different sets i.e. set 0, set 1, set 2 and set 3 identified by reference numerals 210, 212, 214, 216 respectively. It will be appreciated that a number of sets other than three could be provided depending upon the particular embodiment. A 32-bit data element 250 shown at the top of FIG. 2 corresponds to the 32-bit virtual address output by the address generation unit 112. As shown in FIG. 2, bits [13:12] of the virtual address are supplied to the main TLB and serve to select which one of the sets, set 0, set 1, set 2 or set 3 is appropriate to the particular virtual address. Bits 14 to 31 of the virtual address from the data element 250 are supplied to a pair of comparators 262 and 264 in order to select the particular entry within the given set. The other inputs to each of the comparators 262 and 264 correspond to the bits 14 to 31 of the virtual address field 222 in the corresponding matching main TLB entry 220. The comparator 262 receives as an input VA[31:14] from field 222 of the main TLB entry 220 stored in the first RAM 272 of the matching set whilst the comparator 264 receives as an input VA[31:14] from field 222 of the main TLB entry 220 stored in the second RAM 274 of the matching set. It is not known in advance, which of the two RAMs of the correct set holds the physical address that matches VA[31:14] from the data element 250. A combined output of the two comparators 262, 264 is applied as input to the multiplexer 266 and is used to select the appropriate 20 bits of physical address from the physical address field 224 within the main TLB entry corresponding to the virtual address 250.

Thus bits 12 through to 31 of the physical address PA[31:12] corresponding to the virtual address 250 is output by the multiplexer 266, together with a corresponding superset of attributes from the field 226 of the matching main TLB entry 220. The value PA[31:12] output by multiplexer 266 is supplied back to the micro TLB 130 for storage in the primary storage bank 132. As shown in the micro TLB 130 of FIG. 2, the primary storage bank has an address translation entry 230 comprising: a 20-bit virtual address; a 20 bit physical address; an "attributes A" field; and an "attributes B" field. The contents of the attributes A field and the attributes B field could be many and varied, but comprise at least a subset of the superset of attributes 226 stored in the main TLB in relation to that translation.

The secondary storage bank 130 comprises an address translation entry 240 comprising: 20 bits of virtual address; 20 bits of a corresponding physical address; and an "attributes A" field. Thus the illustrative address translation entry 240 in the secondary storage bank has less information than the address translation entry 230 and the primary storage bank. In particular, the secondary storage bank address translation entry 240 is missing the "attributes B" field. Note that although only the single entry is shown in the secondary storage bank 134, the secondary storage bank is configured to store a plurality of virtual address translation entries whilst the primary storage bank of this embodiment stores only a single address translation entry. Although the secondary storage bank 134 comprises more individual address translation entries than the primary storage bank 132, the information in each of the plurality entries of the secondary storage bank is less than the information stored in the single entry of the primary storage bank 132. Furthermore, the primary storage bank 132 supports more page sizes than does the secondary storage bank 134. In fact, the primary storage bank supports page sizes of either one mega byte or 4 kilo bytes whilst the secondary storage bank supports only 4 kilo byte page table entries. The page size for the primary storage bank entry is stored as part of the attribute information.

Figure 3B:
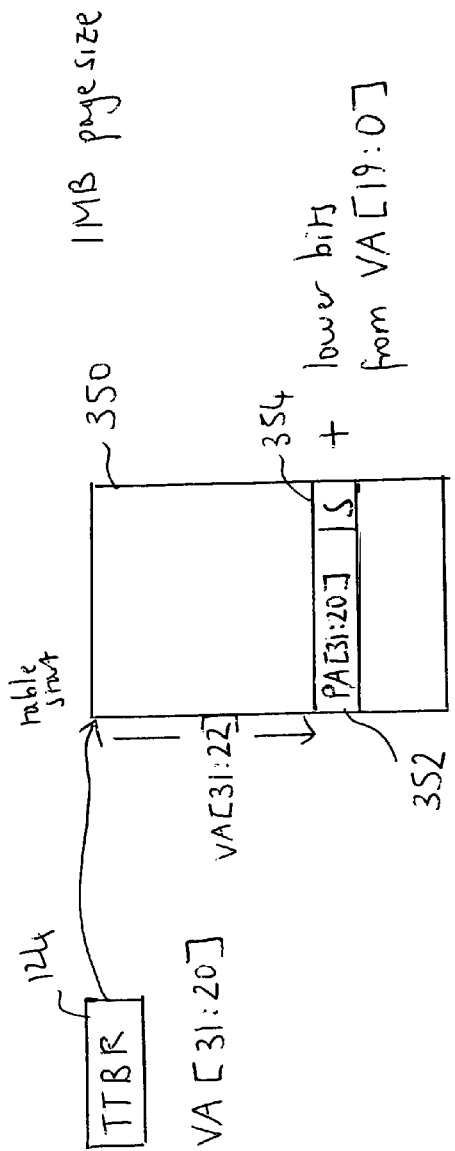

FIG. 3 schematically illustrates a two-level top-down page table walk performed by the main TLB 120 in the event of a miss in the main TLB 120 when the page size is 4 kilo bytes. As shown in FIG. 1 and FIG. 3A, the main TLB 120 includes the translation table base register 124, which stores a value used to start a page table walk. Typically the value stored in the translation table base register 124 will be process dependent. The embodiment of FIG. 1 and FIGS. 3A and 3B supports two different page sizes, i.e. 4 kbytes and 1 Mbytes. When the translation table base register 124 is read at the beginning of the page table walk it is not known which page size the virtual address for translation corresponds to. The page size becomes apparent as the page table walk progresses as described below.

The two level top-down page table walk illustrated in FIG. 3A is performed by the main TLB 120 (see FIG. 1) in the event of a miss for the particular virtual address. The main TLB 120 derives from the translation table base register 124 an address pointing to the start location of the highest-level translation table 310. Bits VA[31: 22] i.e. ten bits of the virtual address are used to provide an index into this translation table (i.e. to select an entry within the table itself) and to identify a pointer 212 to the start address of the second level translation table 320. The first level page table entry further comprises a size field "S" 314, which specifies that the page size is 4 Kbytes in this case. To provide an index into the second level translation table 320, bits [21: 12] of the virtual address (i.e. the next ten bits) are then used. Thus bits VA[21: 12] are used to identify an appropriate physical address translation entry within the second table 320 comprising physical address bits PA [31: 12] and overall corresponding to the virtual address bits [31: 18]. These bits of the physical address derived from within the second level page table 320 are concatenated with bits [11: 0] of the virtual address, which are identical to bits [11: 0] of the physical address. Effectively, the least significant twelve bits of the virtual address are not translated and this corresponds to the granularity of the translation performed and accordingly to the page size of the virtual memory and the physical memory between which translations are made. In this case, the page size of the pages of physical memory and the page size of the pages of virtual memory are 4 kB. The second level page table entry 322 comprises a set of attributes in addition to the physical address bits [31:12].

The translation data recovered from the top down page table walk illustrated in FIG. 3A is cached within the micro TLB 130 and, in particular, is cached within the primary storage bank 132 of the micro TLB 140 such that if another memory access is made to the same virtual address while the translation data persists within the micro TLB 130, then another page table walk need not be performed. When storage space is required for a newer virtual to physical address translation then the entry stored in the primary storage bank of the micro TLB 130 is conditionally promoted to the secondary storage bank 132 depending upon the set of attributes associated with that entry. Otherwise the entry is partially discarded or even completely discarded. In this case, another page table walk will have to be performed to retrieve the discarded information.

FIG. 3B schematically illustrates a single level page table lookup operation for the case where the page size is 1 Mbyte. The page table walk of the operation of FIG. 3B is similar in principle to that illustrated in FIG. 3A and discussed above, except that in this case, the translation tables have a size of 1 MB instead of 4 kB. The larger size of page enables more bits of virtual address to be translated with each translation table access and as a result the page table lookup in FIG. 3B is a single level lookup compared to the two level lookup of FIG. 3A. As explained above, it is not known upon starting the page table walk based on the value stored in the translation table base register what size the page for the virtual address in question will be. The page size becomes apparent at the first level of the lookup. If the page size is 1 Mbyte, a single level of page table walk is all that is required and in this case the page entry indexed directly by the TTBR 124 comprises a page size field "S" 354 indicating that it is a 1 Mbyte page and further comprises bits [31:20] of the physical address and a set of attributes corresponding to the physical address.

Due to the page size of 1 MB, the least significant 20 bits of the virtual address become the least significant 20 bits of the physical address in this case. Compare this with the situation in FIG. 3A when only the least significant 12 bits of the virtual address corresponded to the least significant 12 bits of the physical address. Thus for the 1 MB page size the granularity of the memory page size is 20 bits. This larger granularity further decreases the number of virtual address bits that need to be translated to physical address bits and accordingly reduces the number of levels of page table walk required. Thus as shown in FIG. 3B, an index is provided to the top of the first page table via the translation table base register 124 entry and the entry within that first table appropriate to the virtual address represented by virtual address bits [31: 20] is indexed via virtual address bits VA [31: 22] i.e. ten bits of the full thirty-two bit virtual address. These ten bits of virtual address provide an index to the entry 352 within the first page table 350 which contains physical address bits PA[31: 20] that uniquely identify which mega byte chunk of memory corresponds to the input virtual address as well as specifying the 1 Mbyte table size via the size field 354 and detailing a set of attributes (not shown). Thus the virtual address translation of FIG. 3B is made up of concatenation of physical address bits [31: 20] directly derived from the page table entry from the page table 350 and the lower-most twenty bits of the virtual address which are identical to the lower-most twenty bits of the physical address.

Note for the 4 kB page size of FIG. 3A, each physical address entry in the page table entry comprises bits PA [31: 12] whilst for the 1 Mbyte page table of FIG. 3B each physical address entry on the page table comprises only twelve bits (i.e. PA [31: 20]). This is because fewer bits are required to uniquely identify which one mega byte chunk of memory corresponds to the given virtual address than the number of bits required to specify which 4 kilo byte chunk of memory corresponds to the virtual address. This assumes a fixed memory size divided up into a number of pages corresponding to the page size.

Figure 4:
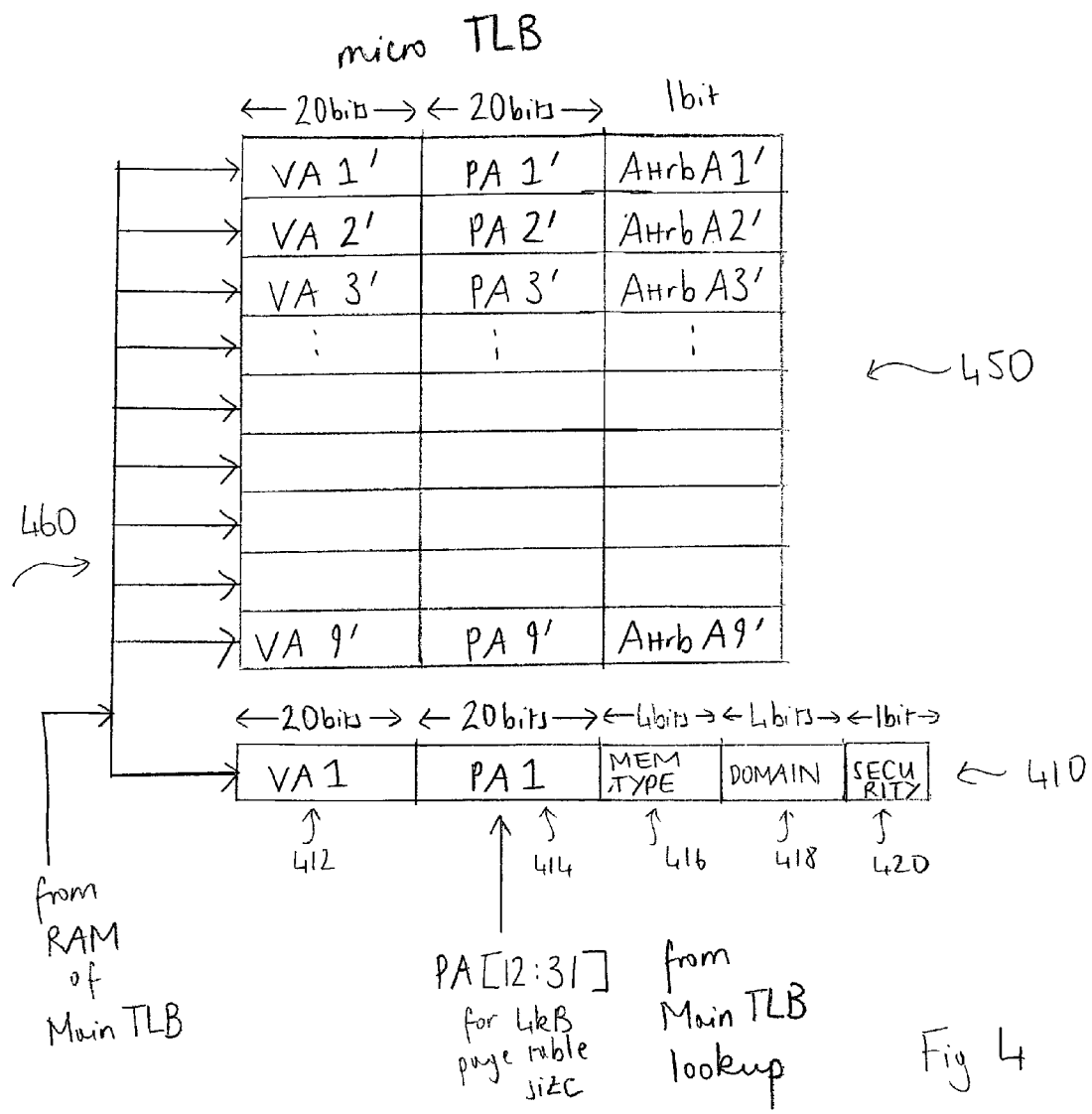
FIG. 4 schematically illustrates contents of individual translation entries in both the primary storage bank and the secondary storage bank of the micro-translation lookaside buffer of FIG. 1.

FIG. 4 schematically illustrates in more detail the contents of the micro TLB 130 of FIG. 1. As shown in FIG. 4, the primary storage bank 410 comprises a single translation entry whilst a secondary storage bank 450 comprises, in this case, nine secondary address translation entries. Notably, the quantity of attribute information per entry in the secondary storage bank 450 comprises only a single bit whilst the amount of attribute information in the primary storage bank 410 comprises a total of nine bits. A system of connecting wires 460 connect each of the nine entries of the secondary storage bank 450 and the single entry of the primary storage bank 410 directly to the random access memory of the main TLB 120 of the arrangement of FIG. 1. However, new translation entries supplied from the main TLB 120 to the micro TLB 130 of FIG. 1 are preferentially stored only in the primary storage bank 110 upon initial receipt of the translation from the main TLB and are conditionally copied to the secondary storage bank 450 in a subsequent processing cycle. The conditions place upon copying the entry from the primary bank 410 to the secondary bank 450 depend upon whether the set of attributes associated with the primary storage bank translation entry 410 is appropriate for storage in the format with the reduced set of attributes in which the entries are stored in the secondary storage bank 450.

Reducing the quantity of attribute information stored in the secondary storage bank 450 to a single bit rather than the nine bits stored in the primary storage bank 410 saves area and power in the circuitry of the second storage bank 450. Furthermore, restricting which entries of the micro TLB are updated with the most recently translated entries (i.e. the new entries) reduces the fanout on the source of the updates i.e. the fanout in the circuitry connecting the output of RAM of the main TLB to the input of the micro-TLB. This can be seen from the circuitry 460 where there is fanout of nine separate wires for the secondary storage bank 150, whereas there is a single wire for the primary storage bank 410. Storing the translation entries preferentially in the primary storage bank 410 can thus improve timing. In the case of the FIG. 4 embodiment, since new entries being written to the primary storage bank 410 are being supplied directly from the random access memory outputs of the main TLB 120, the source is timing-critical so restricting the number of entries from the primary storage bank 410 to a single entry reduces the fanout on the source. In alternative embodiments, new entries in the primary storage bank may come from a different level in the memory hierarchy.

As shown in FIG. 4, each entry in the secondary storage bank 450 comprises twenty bits of the virtual address, twenty bits of a physical address and a single bit of attribute information. However, the primary storage bank translation entry comprises a twenty bit virtual address field 412, a twenty bit physical address 414. but in addition comprises a four bit memory type field 416, a four bit domain field 418 and a one bit security field 420. The memory type field, the domain field and the security field 416, 418, 420 are all examples of information that are present in the primary storage bank entry 410 but not in the secondary storage bank entry 450.

The domain field 418 is a four bit field that specifies one of sixteen memory domains corresponding to the memory location associated with the given virtual address and given physical address. The one-bit security field specifies that the memory location corresponds to either secure memory or non-secure memory. The four bit memory-type field is described in more detail with reference to FIG. 5 below, but specifies memory attributes such as cacheability type and whether the memory location is readable/writeable. Each of these three attributes i.e. the memory type 416, the memory domain 418 and the security information 420 may be discarded when the entry in the primary storage bank 410 is promoted to the secondary storage bank 450, because it can be assumed that all of the entries in the second bank comprise a given value for each of these particular attributes.

For example, with regard to the domain field, the secondary storage bank 450 can only contain entries to memory domains that are currently accessible. If the victim entry in the first bank elected for eviction to the secondary storage bank 150 specifies a domain in the domain field 418 that is not currently accessible to the processor, then the entry itself is discarded rather and stored in the secondary storage bank 450 following eviction from the primary storage bank. With regard to the security state field 420, all entries in the secondary storage bank 450 can be assumed to refer to the current security state. Any victim entries in the primary storage bank 410 elected for eviction to the secondary storage bank 450 that relate to a different security state than the current security state are discarded rather than being demoted for storage to the secondary storage bank 450. Where assumptions are made about entries in the secondary storage bank with regard to particular attributes that are not specifically stored in the secondary storage bank, where the processing condition upon which the assumption was based changes in a later processing cycle then appropriate action must be taken, For example, if the current security state changes, then all entries in the secondary storage bank are flushed to prevent them from being incorrectly interpreted.

With regard to the memory type attribute 416, if the particular processor implementation only supports a subset of possible memory attributes or it is unlikely that all of the attributes will be used, then the full set of attributes derived from the superset of attributes 226 (see FIG. 2) of the main TLB can be held in the entry 410 of the primary storage bank whilst a more limited set of memory-type attributes comprising a single bit can be stored in the secondary storage bank 450. In this case when an entry is evicted from the primary storage bank to the secondary storage bank 450 only a portion of the attribute information is retained and the extraneous portion is discarded.

As discussed above in relation to FIG. 2, the primary storage bank is configured to support two different page sizes i.e. 4 kB or 1 MB, whereas the secondary storage bank supports only a 4 kB page size. Thus if an entry elected for eviction from the primary storage bank 410 corresponds to the 1 MB page size that is not supported by the secondary storage bank 450, then that page table entry is converted to a smaller page size and then stored in the secondary storage bank 450. The page size conversion is performed by filling in the lower bits of the virtual and physical address with a specific value. In this case, a value corresponding to the bits from the virtual address that caused the entry to be fetched originally. For example, to convert a 1 Mbyte page to a 4 kbyte page, bits [19:12] of the addresses (which are otherwise not used in a 1 Mbyte page entry) are set to the same value in the page entry, that value being bits [19:12] of the virtual address that caused the page entry to be fetched originally. Alternatively to performing the page size conversion the entry is simply discarded on eviction from the primary storage bank 410.

Note that although the arrangements of FIG. 4 and FIG. 1 each show two storage banks i.e. a primary storage bank and a secondary storage bank both within the micro TLB 130, the present invention is not limited to this and in alternative embodiments there could be an arbitrary number of banks of two or more, all accessed in parallel and each holding progressively less information such as attribute information. Similarly, the plurality of banks is not limited at a plurality of banks within the micro-TLB, at least a subset of the banks can be provided at a different level of the memory hierarchy.

Figure 5:
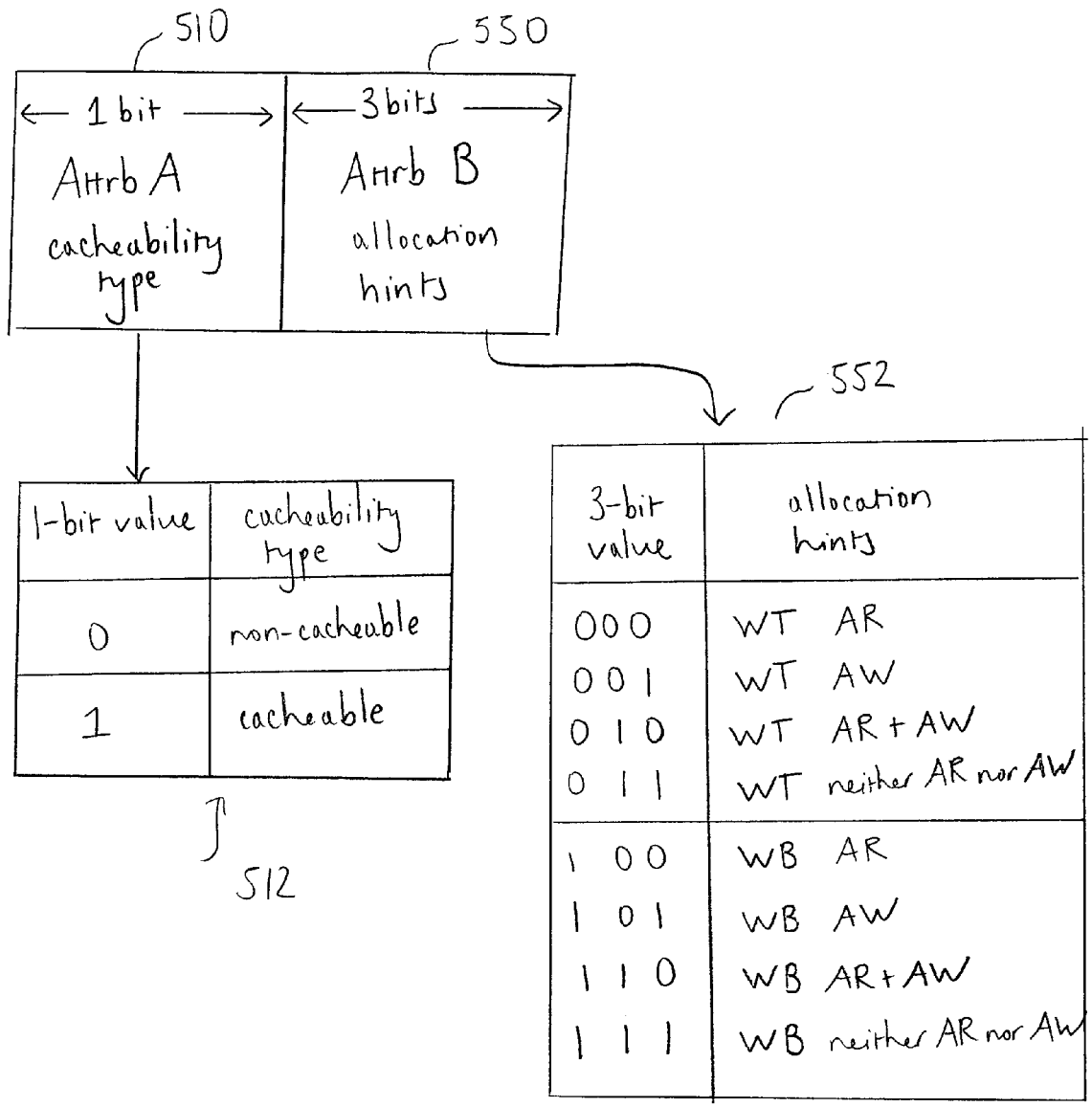
FIG. 5 schematically illustrates particular examples of what is specified by the memory-type attributes of the primary address translation entry of the primary storage bank of FIG. 4.

FIG. 5 schematically illustrates in more detail an example of what is specified by the four-bit memory type field 416 in FIG. 4. The memory type field 416 comprises four bits which is divided into a one bit field specifying the cacheability type and a three bit field 550 specifying allocation hints. As shown in the table 512 in FIG. 5, if the one bit specifying the cacheability type is set to be zero then the memory location is non-cacheable whereas if the one bit value is set to be one then the memory location is cacheable memory. The three bit allocation-hints field 550 specifies the eight different types of allocation hints shown in the table 552. In particular, if the allocation hints value is 000 then the memory location is write through (WT) and allocate read (AR); if the value is 001 then the memory location is write through and allocate write (AW); if the three bit value is 010 then the memory location is write through and both allocate write and allocate read; and if the three bit value is 011 then the memory location is write through and neither allocate read nor allocate write.

As shown in the bottom section of table 552, if the three bit allocation hints value is 100 then the memory location is write back and allocate read; a value of 101 corresponds to write back and allocate write; a value 110 corresponds to write back and at both allocate read and allocate write; whereas a value of 111 corresponds to write back and neither allocate read nor allocate write.

Figure 6:
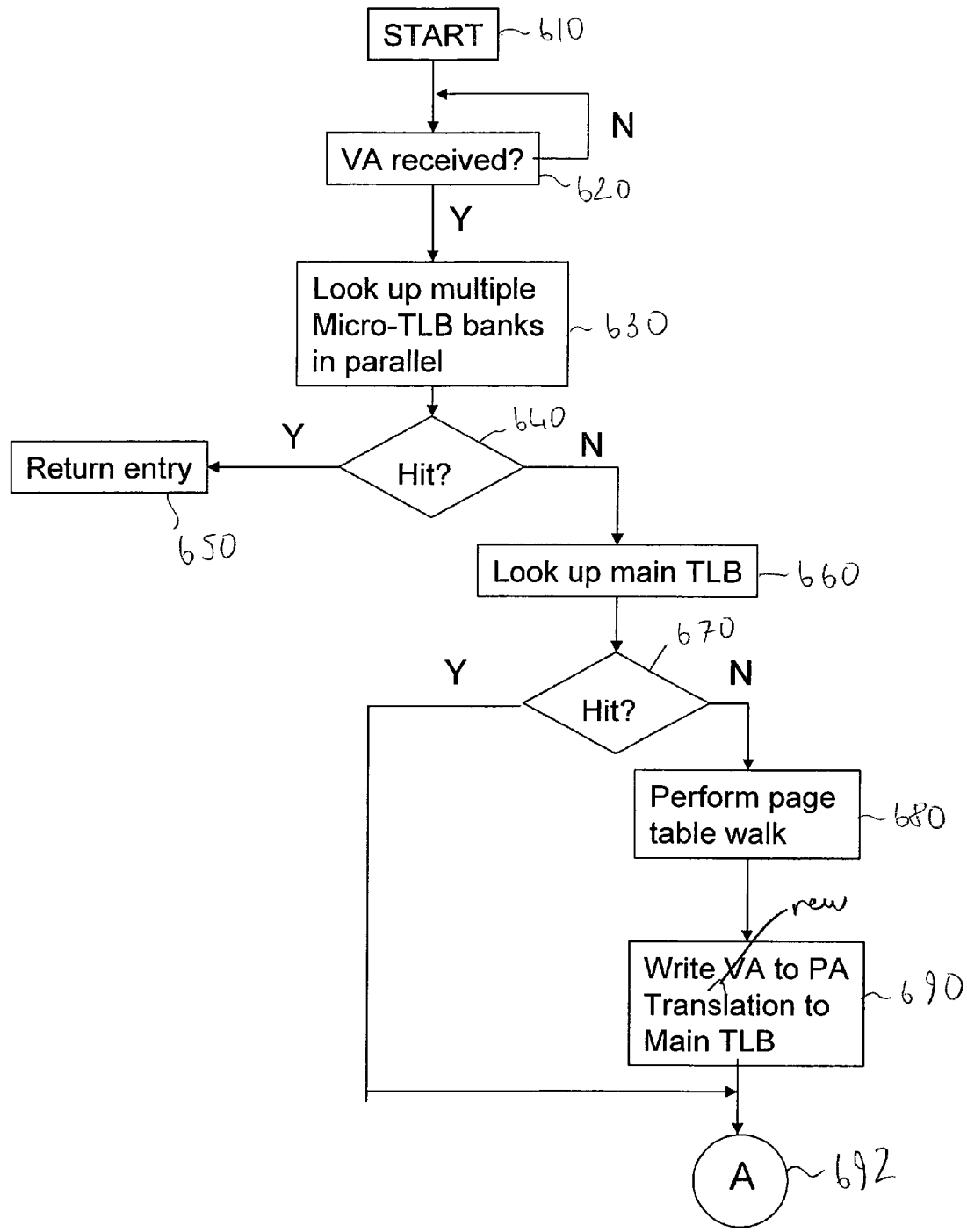
FIG. 6 is a flow chart that schematically illustrates how a virtual to physical address translation is performed and stored.
Figure 7:
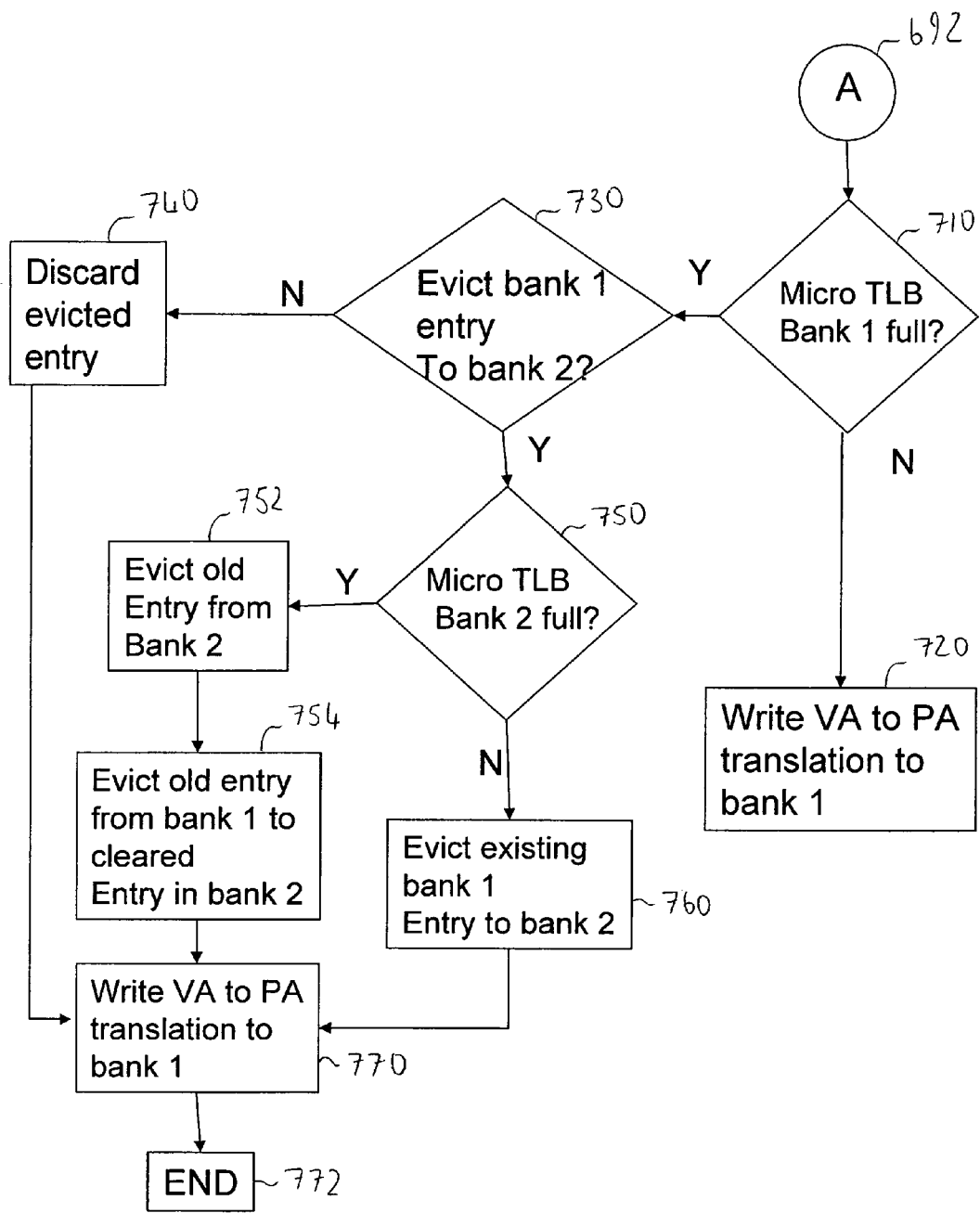
FIG. 7 schematically illustrates, in combination with FIG. 6, how a new virtual to physical address translation is stored using memory address translation circuitry according to the embodiment of FIG. 1.

FIG. 6 is a flow chart that schematically illustrates a virtual address to a physical address conversion process according to an embodiment of the present invention. The remainder of the process is illustrated in FIG. 7, which schematically illustrates how a new address translation is stored in the micro TLB.

The process of FIG. 6 begins at the start stage 610 and proceeds to stage 620 where it is determined by storage bank access in circuitry 136 within the micro TLB 130 (see FIG. 1) whether or not a virtual address has been output by the address generation unit 112 of the core 110. If no virtual address has been received at the micro-TLB then the process returns to the stage 620 of querying whether or not the virtual address has yet been received and this is queried in an iterative manner. If, on the other hand, a virtual address has been received when determined at stage 620 then the process proceeds to step 630. At stage 63, the plurality of storage banks of the micro TLB 140 are looked up in parallel. In this case both the primary storage and the secondary storage bank 132, 134 are looked up in parallel. The process then proceeds to step 640 where it is determined whether or not there is a hit corresponding to a match for the virtual address output the virtual address received at stage 620 with one of the plurality of entries in the secondary storage bank 134 or the single entry in the primary storage bank 132.

If indeed there is a hit at stage 640 within one of the two storage banks within the micro-TLB then the process proceeds to stage 650, whereupon the physical address corresponding to the translation entry is returned to the load store unit 140 of the data processing apparatus of FIG. 1.

If, on the other hand, there is no hit on the micro TLB in either of the primary storage bank or the secondary storage bank at stage 640, then the process proceeds to stage 660 whereupon the main TLB 120 is looked up. Next, at stage 670, it is determined whether or not there is a hit i.e. whether or not there is a match for the virtual address stored within one of the entries within the main TLB 120. If there is a hit at stage 670 then the process proceeds directly to stage 692 labelled "A" and the process proceeds to a correspondingly labelled stage if the flow chart of FIG. 7. If, on the other hand there is no hit within the main TLB 120 at stage 670, then the process proceeds to stage 680 whereupon a page table walk is initiated by the main TLB 120. Next, at stage 690, once the page table walk has been performed and the virtual address to the physical address conversion has been completed, the new virtual to physical address translation is stored at stage 690 into an entry of the main TLB 120. Thus the main TLB acts as a cache for the most recently translated virtual addresses. The process then proceeds to stage 692, which is described in the flow chart of FIG. 7.

Referring now to the flow chart of FIG. 7, the process starts from stage 692 where it left off at the end of FIG. 6. Next, at stage 710 it is determined whether or not the primary storage bank of the micro TLB 130 is full or not. If the primary storage bank (i.e. the single entry of that bank) is empty then the process proceeds to stage 720 and the new virtual address to physical address translation is stored in the primary storage bank 132. Depending on the attributes supported by the primary storage bank either the full superset of attributes associated with the address translation derived from the memory 160 is stored within the primary storage bank entry or only a subset of the superset attributes is stored in the primary storage bank. If, on the other hand, at stage 710 it is determined that the single entry of the primary storage bank is full then the process proceeds to stage 730 whereupon it is determined whether or not to evict the entry currently stored in the primary bank to the secondary storage bank.

Eviction of the entry from the primary bank for storage in the secondary storage bank is dependant upon the attributes associated with the primary storage bank entry. So depending on the attributes, the entry evicted from the primary storage bank may discarded in full, or a portion of the attributes may be discarded and the remainder of the entry stored in the secondary storage bank. Thus for example, as explained above, if the security attribute associated with the current primary bank entry does not correspond to the current security state then the entry will be discarded, but otherwise the entry will be stored in the secondary storage bank, an assumption being made that all entries stored in the secondary storage bank have the same security status.

If it is decided at stage 730 that it would not be appropriate to store the evicted entry from the primary storage bank in the secondary storage bank then the evicted entry is discarded at stage 740. The process then proceeds to stage 770 where the virtual to physical address translation is written to the primary storage bank and then the process ends at stage 772.

If, on the other hand, it is decided at stage 730 that the primary storage bank entry can in fact be stored in the secondary storage bank then the process proceeds to stage 750 where it is determined whether or not the secondary storage bank is full. If the secondary storage bank is not completely full then the process proceeds to stage 760 and the primary storage bank entry is evicted form bank 1 and at the same time a corresponding entry written into a previously vacant entry the secondary storage bank. The process then proceeds to stage 770 and the newly generated virtual address to physical address translation derived from the page table look up is stored into the primary storage bank entry. The process then ends at stage 772.

If, on the other hand, it is determined at stage 750 that the secondary storage bank is full, the process proceeds to stage 752. At stage 752 an old entry is evicted from the secondary storage bank (using a standard eviction policy e.g. round robin). Next at stage 754 the existing entry in the primary storage bank is evicted from the primary storage bank and stored in the cleared entry in the secondary storage bank. The process then proceeds to stage 770 whereupon the newly generated virtual address to physical address translation is stored in the single entry primary storage bank. The process then ends at stage 772.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
    translation buffering circuitry configured to store a plurality of memory address translation entries, each translation entry providing a conversion from a virtual memory address to a physical memory address, said buffering circuitry comprising:
    a primary storage bank configured to store at least one primary address translation entry;
    a secondary storage bank configured to store at least one secondary address translation entry;
    storage bank accessing circuitry configured to be responsive to receipt of a virtual memory address for which a translation is required to perform parallel access to both said primary storage bank and said secondary storage bank to establish if any of said at least one primary address translation entry and said at least one secondary address translation entry represents a match for said virtual memory address;
    buffering management circuitry configured to transfer at least one address translation entry between said primary storage bank and said secondary storage bank depending upon an occupancy level of at least one of said primary storage bank and said secondary storage bank.

2. Apparatus as claimed in claim 1, wherein said primary storage bank has a first number of primary address translation entries and said secondary storage bank has a second number of secondary address translation entries and wherein said first number is less than said second number.

3. Apparatus as claimed in claim 2, wherein said buffering management circuitry is configured to be responsive to receipt of a new buffering request for buffering of a translation from a virtual memory address to a physical memory address to preferentially store said translation in said primary storage bank rather than in said secondary storage bank.

4. Apparatus as claimed in claim 3, wherein said buffering management circuitry is configured to store said new translation in said primary storage bank in a predetermined processing cycle and to conditionally promote said new translation for storage in said secondary storage bank in a later processing cycle.

5. Apparatus as claimed in claim 1 wherein said primary storage bank supports a first number of page sizes and said secondary bank supports a second number of page sizes, said second number being different from said first number.

6. Apparatus as claimed in claim 5, wherein said first number of page sizes is greater than said second number of page sizes.

7. Apparatus as claimed in claim 4, wherein said at least one primary address translation entry has at least one respective primary attribute specifier of a first bit-length and said at least one secondary address translation entry has at least one respective secondary attribute specifier of a second bit-length and wherein said second bit-length is different from said first bit-length.

8. Apparatus as claimed in claim 7, wherein said first bit-length is greater than said second bit-length.

9. Apparatus as claimed in claim 8, wherein said conditional promotion depends upon a comparison between at least a portion of contents of said primary attribute specifier and contents of said secondary attribute specifier.

10. Apparatus as claimed in claim 8, wherein upon promotion of said new translation from said primary storage bank to said secondary storage bank, at least a portion of contents of said primary attribute specifier of said new translation entry identified for promotion is discarded upon promotion of said new translation to said secondary storage bank in view of said first bit-length being greater than said second bit-length.

11. Apparatus as claimed in claim 8, wherein all secondary translation entries of said secondary storage bank are assumed to have a given value of a predetermined attribute.

12. Apparatus as claimed in claim 11, wherein if a value of said predetermined attribute of a primary translation entry corresponding to said new translation is different from said given value assumed for said secondary storage bank then said conditional promotion of said new translation from said primary storage bank to said secondary storage bank is aborted and said new translation is completely discarded upon eviction from said primary storage bank.

13. Apparatus as claimed in claim 11, wherein if a corresponding value of said predetermined attribute of a primary translation entry corresponding to said new translation is different from said given value assumed for said secondary storage bank then said conditional promotion of said new translation from said primary storage bank to said secondary storage bank is performed such that a portion of said new translation is promoted to said secondary storage bank whilst a further different portion of said new translation is discarded.

14. Apparatus as claimed in claim 7, wherein said primary attribute specifier comprises at least one of: a domain specifier, a security state specifier and a memory-type attributes specifier.

15. Apparatus as claimed in claim 1, wherein said primary storage bank belongs to a first hierarchical level in a memory hierarchy and said secondary storage bank belongs to a second hierarchical level in said memory hierarchy.

16. Apparatus as claimed in claim 11, wherein said first hierarchical level is the same as said second hierarchical level.

17. Apparatus as claimed in claim 15, wherein said first hierarchical level is different from said second hierarchical level.

18. Apparatus as claimed in claim 17, wherein said primary storage bank and said secondary storage bank are both components of a micro Translation Lookaside Buffer.

19. A method of processing data comprising the steps of:
    storing a plurality of memory address translation entries in translation buffering circuitry, each translation entry providing a conversion from a virtual memory address to a physical memory address;
    storing at least one primary address translation entry in a primary storage bank of said translation buffering circuitry;
    storing at least one secondary address translation entry in a secondary storage bank of said translation buffering circuitry;
    responsive to receipt of a virtual memory address for which a translation is required, performing parallel access to both said primary storage bank and said secondary storage bank to establish if any of said at least one primary address translation entry and said at least one secondary address translation entry represents a match for said virtual memory address; and
    transferring at least one address translation entry between said primary storage bank and said secondary storage bank depending upon an occupancy level of at least one of said primary storage bank and said secondary storage bank.

20. Apparatus for processing data comprising:
    means for translation buffering configured to store a plurality of memory address translation entries, each translation entry providing a conversion from a virtual memory address to a physical memory address, said means for translation buffering comprising:
    first means for storing at least one primary address translation entry;
    second means for storing at least one secondary address translation entry;
    means for translation accessing configured to be responsive to receipt of a virtual memory address for which a translation is required to perform parallel access to both said fist means for storing and said second means for storing to establish if any of said at least one primary address translation entry and said at least one secondary address translation entry represents a match for said virtual memory address; and
    means for buffering management configured to transfer at least one address translation entry between said first means for storing and said second means for storing depending upon an occupancy level of at least one of said first means for storing and said second means for storing.

* * * * *